No. 749,973. PATENTED JAN. 19, 1904.
C. A. SOUTHWICK.
AUTOMATIC CONTROL FOR RETURN TRAPS.
APPLICATION FILED MAR. 23, 1903.
NO MODEL.
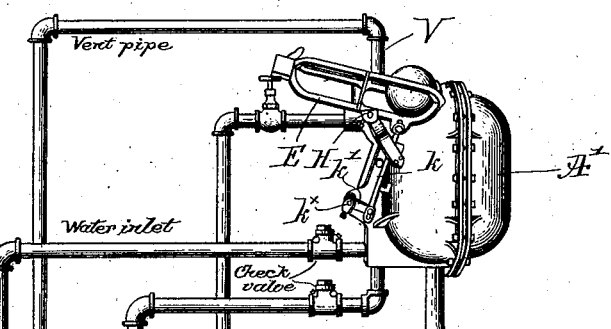
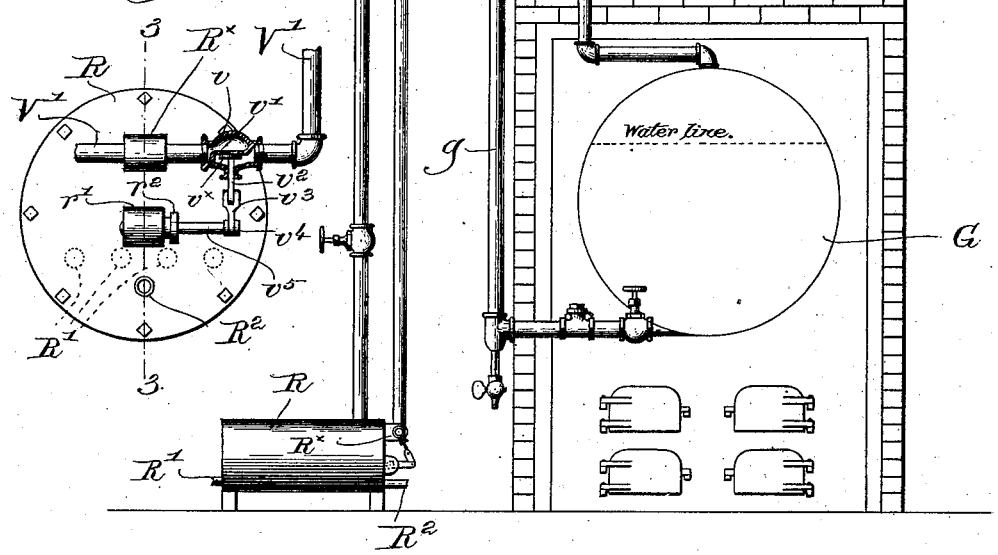
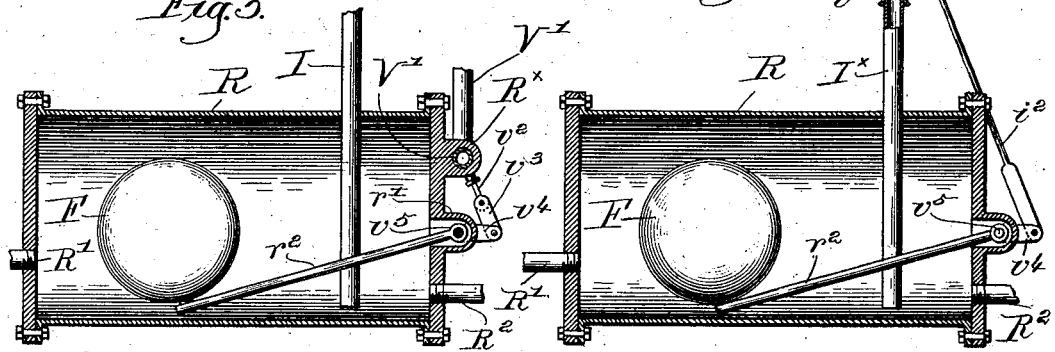
Witnesses:
Thomas J. Drummond
J. William Lutton
Inventor:
Charles A. Southwick,
by Crosby & Gregory
attys.
THE NORRIS PETERS CO., PHOTO-LITHO., WASHINGTON, D. C.

No. 749,973.

Patented January 19, 1904.

UNITED STATES PATENT OFFICE.

CHARLES A. SOUTHWICK, OF PEABODY, MASSACHUSETTS.

AUTOMATIC CONTROL FOR RETURN-TRAPS.

SPECIFICATION forming part of Letters Patent No. 749,973, dated January 19, 1904.

Application filed March 23, 1903. Serial No. 149,009. (No model.)

*To all whom it may concern:*

Be it known that I, CHARLES A. SOUTHWICK, a citizen of the United States, and a resident of Peabody, county of Essex, and State of Massachusetts, have invented an Improvement in Automatic Control for Return-Traps, of which the following description, in connection with the accompanying drawings, is a specification, like letters on the drawings representing like parts.

The condensed steam from heating apparatus—such as coils, radiators, &c.—is returned to the boiler by different types of apparatus, one well-known apparatus comprising a return-trap which is connected with a suitable receiver for the condensation-water from the heating system. The trap is connected with the steam-space of the boiler and also with the latter below the water-line, and by means of a float in the trap a valve is automatically opened and shut. As the water passes from the receiver to the trap the float rises, and when the trap-body is full the float effects the opening of the steam-valve, so that the pressure above and below the trapped water is equalized and the water flows through the discharge-pipe to the boiler. When the trap has emptied itself, the falling float operates to close the steam-valve and opens a vent, permitting the pressure in the trap to fall, so that water will again enter from the receiver. The closing of the steam-valve is accompanied by opening of the vent, and in practice the vent-pipe is provided with a valve, regulated or set by hand according to the judgment of the operator. A return-trap of this general character is shown in United States Patent No. 626,730, granted to me June 13, 1899, the water inlet and discharge pipes of the trap being provided with suitable check-valves. With such apparatus now in use there is no automatic accommodation to varying conditions, such as changes in the quantity of water returned from the system to the receiver.

The return-traps are usually located over the boiler, and the hand-valve governing the vent-opening is infrequently changed and generally it is left only slightly open. It often becomes closed from jarring, unequal expansion of parts, collection of sediment, &c., and of course the trap is rendered inoperative, the system filling up with the condensation-water which the trap fails to discharge. Again, if the hand-valve is set for a certain rate of discharge and an abnormal quantity of water flows to the receiver, as is often the case when additional portions of the heating system are turned on, the trap cannot work rapidly enough to take care of the additional volume of water. Usually the attendant will not be aware of this until he receives a complaint about the failure of the apparatus to properly heat, and then the vent-valve can be opened wider to quicken the operation of the trap. If the vent is opened wider than necessary for the average rate of condensation, or the amount of condensation is small, steam will pass from the system through the trap and vent to the outer air, causing waste. Other practical defects are encountered by those familiar with such apparatus, and it is the object of my present invention to provide simple and efficient means for controlling automatically the operation of the trap in accordance with the varying conditions in the flow of condensation-water in the heating system as a whole.

The various novel features of my invention will be described in detail in the subjoined specification, and particularly pointed out in the following claims.

Figure 1 is a view of a portion of a steam heating system, showing the steam-generator, return-trap, receiver, connections between the trap and receiver and generator, and with one embodiment of my invention in operative connection therewith. Fig. 2 is an enlarged right-hand end elevation of the receiver shown in Fig. 1 and partly broken out to show the automatically-controlled vent-valve. Fig. 3 is a longitudinal sectional detail on the line 3 3, Fig. 2, through the receiver; and Fig. 4 is a view similar to Fig. 3, illustrating a modified form of automatic control for the apparatus to be described.

Referring to Fig. 1, the steam generator or boiler G is shown as connected by a discharge-pipe $g$ with the lower portion of the body A' of the return-trap, which may be substantially of the construction shown and described in my United States Patent No. 626,730, referred to, a second pipe $g^x$ leading from the steam-space of the generator to the upper part of the trap-body and controlled by a steam-valve operated by the cradle E, fulcrumed at H. A link $k$ connects the cradle and a rocker-arm $k'$ on a rock-shaft $k^x$, the latter being turned by or through the rise and fall of a float (not shown) in the trap-body, as provided for in the patent referred to.

The receiver R is placed below the lowest coil, &c., from which condensation-water is to be returned, the several drip or return pipes from the system being connected with the receiver at R', a blow-off being shown at $R^2$. An inlet-pipe I leads from the lower part of the receiver up to the trap-body, said pipe and the discharge-pipe $g$ being provided with suitable check-valves, as indicated in Fig. 1.

The vent-pipe V, leading from the trap, has no hand-operated valve in the present embodiment of my invention, and in Fig. 1 I have shown the vent-pipe as continued at V' down to the receiver and passing across the end thereof, the bend being supported in a boss $R^x$.

A valve-case $v$ is located in the pipe V', (see Fig. 2,) having a seat $v'$ and a coöperating valve $v^x$, its stem $v^2$ being connected by a link $v^3$ with a rocker-arm $v^4$. The latter is secured to a rock-shaft $v^5$, mounted in and extended through a stuffing box or gland $r$ on an enlargement $r'$ of the end of the receiver, and within the latter a long arm $r^2$ has secured to it a float F, as shown in Fig. 3. Beyond the valve-case $v$ the vent-pipe V' leads to the open air at any suitable point.

When the receiver is empty, the float F is in the position shown in Fig. 3, and the vent-controlling valve $v^x$ is closed upon its seat; but when condensation-water accumulates in the receiver the float rises, opening the valve $v^x$ wider the higher the float rises.

From the receiver the water passes up pipe I to the trap, and as the body of the latter fills the float therein rises, and when the trap is full the cradle E is quickly tilted, and thereby the usual steam exhaust or vent in the trap is shut and the steam-valve is opened, equalizing the pressure at the top and bottom of the water in the trap, and this water flows through the discharge-pipe $g$ to the generator G. In my patent referred to the exhaust or vent in the trap is shown at $b$, Fig. 1. As the water flows out of the trap the float therein drops and tilts the cradle, which returns to the position shown in the drawings, shutting off the steam-valve and opening the exhaust or vent in the trap, so that any steam therein can escape through pipes V V' to the outer air. Such venting of the trap relieves the pressure therein and the water can again enter from the receiver, repeating the described operation as often as the trap is filled. Now if the condensation-water is accumulating rapidly in the receiver it is necessary that the vent for the trap shall be well opened, so that the trap may fill and operate as rapidly as possible in order to take care of the condensation-water. This is effected by the float F in the receiver, which by its rise opens wide the valve $v^x$, and as long as there is enough water in the receiver the valve will be maintained wide open, thus permitting the maximum speed of operation for the trap. When the rate of condensation decreases, however, the trap will dispose of the water more rapidly than it accumulates in the receiver, and the float F will descend proportionately and correspondingly throttle the vent-pipe, so that the operation of the trap will slow down to conform to the requirements. If there is a small quantity of condensation-water to be handled, it is manifest that the automatic valve will be closed down to leave a very small opening, and if the trap disposes of the water at a faster rate than it accumulates then the valve will shut, preventing escape of steam from the system through the trap to the air.

From the foregoing description it will be manifest that the speed of operation of the return-trap is controlled automatically in accordance with the quantity of condensation-water to be returned to the boiler. The larger the quantity the more rapidly will the trap operate, and vice versa, and if practically none is to be considered then escape and waste of steam is prevented. I can also control the operation of the return-trap by using a constant vent-opening and governing automatically the inflow of water to the trap, permitting a greater inflow when there is more rapid condensation and reducing the inflow correspondingly when the condensation decreases, the constant vent-opening for the trap being large enough for the maximum speed of operation of the trap. In Fig. 4 such a modification is illustrated, the inlet-pipe $I^x$ having a valve-case $i$ therein above the receiver, the valve $i^x$ being shown as rotatable and provided with an arm $i'''$, connected by a link $i^2$ with the rocker-arm $v^4$, the float in the receiver and its connection with the rocker-arm being the same as heretofore described.

When the condensation is rapid, the accumulation of water in the receiver lifts the float F correspondingly and the valve $i^x$ is opened wider, while for less rapid condensation the float falls and the valve is closed down a corresponding amount.

Of course in the modified arrangement the vent-pipe V would lead direct to the outer air, and it would in practice be provided with a hand-valve to enable the operator to adjust the vent-opening to the size best suited for the proper operation of the apparatus.

My invention is not restricted to the precise construction and arrangement herein shown and described, to the particular form of return-trap, the specific construction of the receiver, or the particular character of the means for controlling automatically the speed of operation of the trap, as changes of various kinds may be made by those skilled in the art without departing from the spirit and scope of my invention.

Having fully described my invention, what I claim as new, and desire to secure by Letters Patent, is—

1. A steam-generator, means, including a return-trap, to return condensation-water to the generator, and means forming no part of the trap to control automatically the speed of operation of the trap in accordance with the quantity of condensation-water to be returned thereby to the generator.

2. A steam-generator, means, including a return-trap, to return condensation-water to the generator, a receiver in which such water collects, an inlet for the trap, communicating with the receiver, and means separate from and to control automatically the speed of operation of the trap in accordance with the rate of accumulation of the condensation-water in the receiver.

3. A steam-generator, means, including a return-trap to return condensation-water to the generator, a receiver in which such water collects, an inlet for the trap, communicating with the receiver, and means, including a valve operated by the water in the receiver, to control automatically the speed of operation of the trap in accordance with the inflow of condensation-water to the receiver, said means forming no part of the trap.

4. A steam-generator, means, including a return-trap, to return condensation-water to the generator, a receiver in which such water collects, said receiver forming no part of the trap, an inlet for the trap, communicating with the receiver, a float in the latter, and means, including a controlling-valve for the trap, operated by the float, to govern the speed of operation of the trap in accordance with the quantity of water entering the receiver.

5. In apparatus of the class described, a receiver for the water of condensation, a steam-generator, a return-trap to return automatically such water to the generator, a vent-pipe and a water-inlet pipe for the trap, a valve in one of said pipes, and means to adjust the effective opening of said valve automatically and thereby conform the speed of operation of the return-trap to the quantity of condensation-water entering the receiver.

6. A steam-generator, means, including a return-trap to return condensation-water to the generator, a vent-regulating valve for the trap, and means to automatically open and close said valve to an extent in accordance with the rate of accumulation of the condensation-water, to vary the speed of operation of the return-trap in conformity therewith.

7. A steam-generator, means, including a return-trap, to return condensation-water to the generator, a receiver in which such water collects, an inlet for the trap, communicating with the receiver, a vent-regulating valve for the trap, a float in the receiver, and connections between the float and valve to vary the effective opening of the latter in accordance with the rate of influx of the condensation-water to the receiver, to vary the speed of operation of the return-trap in conformity therewith.

8. A receiver, means, including a return-trap intermittingly connected with a source of fluid-pressure, to discharge the receiver, and means forming no part of the trap to control automatically the speed of operation of the trap in accordance with the quantity of water to be discharged thereby from the receiver.

In testimony whereof I have signed my name to this specification in the presence of two subscribing witnesses.

CHARLES A. SOUTHWICK.

Witnesses:
JOHN C. EDWARDS,
MARGARET A. DUNN.